(12) United States Patent
Heidari et al.

(10) Patent No.: US 7,076,010 B1
(45) Date of Patent: Jul. 11, 2006

(54) METHOD AND APPARATUS FOR TIME DOMAIN EQUALIZATION IN AN XDSL MODEM

(75) Inventors: Sam Heidari, Menlo Park, CA (US); Raminder S. Bajwa, Palo Alto, CA (US); Behrooz Rezvani, Pleasanton, CA (US); Dale Smith, Fremont, CA (US); Prem Ramaswamy, San Jose, CA (US)

(73) Assignee: Ikanos Communication, Inc., Fremont, CA (US)

( * ) Notice: Subject to any disclaimer, the term of this patent is extended or adjusted under 35 U.S.C. 154(b) by 666 days.

(21) Appl. No.: 09/876,201

(22) Filed: Jun. 6, 2001

Related U.S. Application Data

(60) Provisional application No. 60/234,719, filed on Sep. 22, 2000, provisional application No. 60/209,880, filed on Jun. 6, 2000.

(51) Int. Cl.
*H03K 5/01* (2006.01)

(52) U.S. Cl. ...................... 375/346; 375/232

(58) Field of Classification Search ............... 375/222, 375/229–232, 346, 348, 350; 370/210, 206, 370/465, 468, 526
See application file for complete search history.

(56) References Cited

U.S. PATENT DOCUMENTS

| 5,051,981 A | | 9/1991 | Kline ..................... 370/32.1 |
|---|---|---|---|
| 5,274,512 A | * | 12/1993 | Tanaka et al. ............... 360/65 |
| 5,285,474 A | | 2/1994 | Chow et al. ................. 375/13 |
| 5,388,123 A | * | 2/1995 | Uesugi et al. .............. 375/234 |
| 5,444,739 A | * | 8/1995 | Uesugi et al. .............. 375/232 |
| 5,479,447 A | | 12/1995 | Chow et al. ............... 375/260 |
| 5,563,911 A | * | 10/1996 | Uesugi et al. .............. 375/232 |
| 5,818,740 A | | 10/1998 | Agazzi .................... 364/724.1 |
| 6,002,722 A | | 12/1999 | Wu .......................... 375/295 |
| 6,055,268 A | | 4/2000 | Timm et al. |
| 6,072,782 A | | 6/2000 | Wu .......................... 370/286 |
| 6,233,276 B1 | | 5/2001 | Simeon |
| 6,285,399 B1 | | 9/2001 | Tao |
| 6,353,629 B1 | | 3/2002 | Pal |
| 6,631,175 B1 | * | 10/2003 | Harikumar et al. ......... 375/350 |
| 6,674,795 B1 | * | 1/2004 | Liu et al. ................... 375/231 |
| 6,754,261 B1 | * | 6/2004 | Liu et al. ................... 375/232 |

* cited by examiner

*Primary Examiner*—Khanh Tran
(74) *Attorney, Agent, or Firm*—IP Creators; Charles C Cary

(57) ABSTRACT

The current invention provides a method and apparatus for time domain equalization in an XDSL modem. A received communication channel is analyzed to determine the highest frequency component thereof. Typically, there is an inverse relationship between the length of a subscriber line and the highest frequency component over which communications can be supported. In response to the frequency determination, the sampling rate for the channel is reduced to the lowest sample rate consistent with maintaining signal integrity on the highest frequency component of the channel. The sampling rate reduction may accomplished in the analog portion of the receive path, e.g. the analog-to-digital converter (ADC) or in a digital decimator coupled thereto. Concurrently the demodulator complexity is also scaled back. Where the XDSL protocol is digital multi-tone (DMT) the input sample size to the discrete Fourier transform (DFT) engine is reduced accordingly. With these adjustments in place TEQ resources may be scaled inversely. Thus as line length increases and the available bandwidth on the subscriber line is reduced more TEQ resources are made available to deal with the increased delay interval over which intersymbol interference is evidenced. Scaling of TEQ resources may be accomplished using a TEQ architecture which allows either the length or the tap line or the delay between taps to be varied.

6 Claims, 7 Drawing Sheets

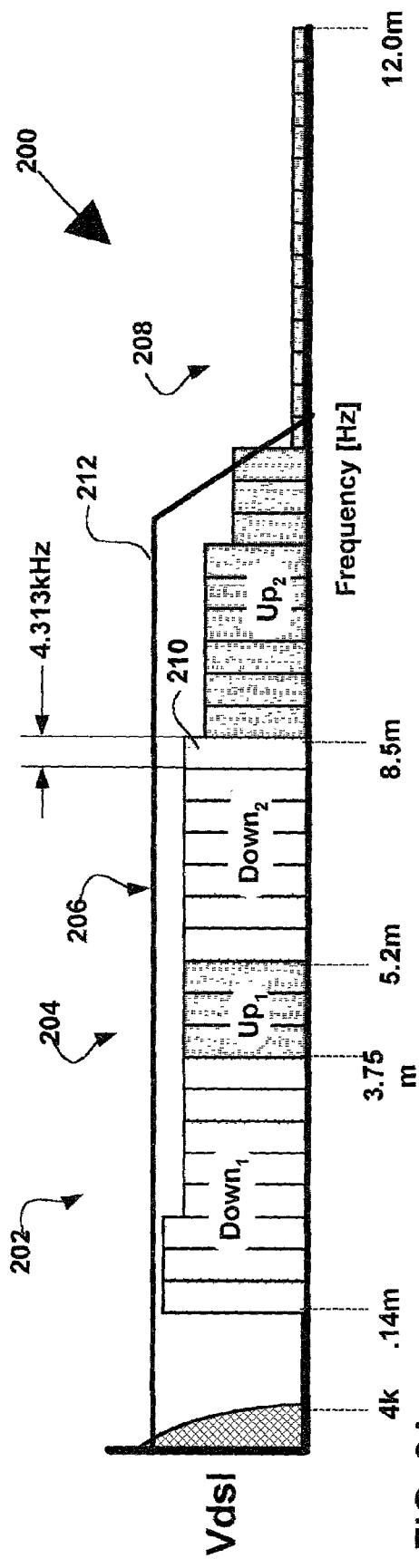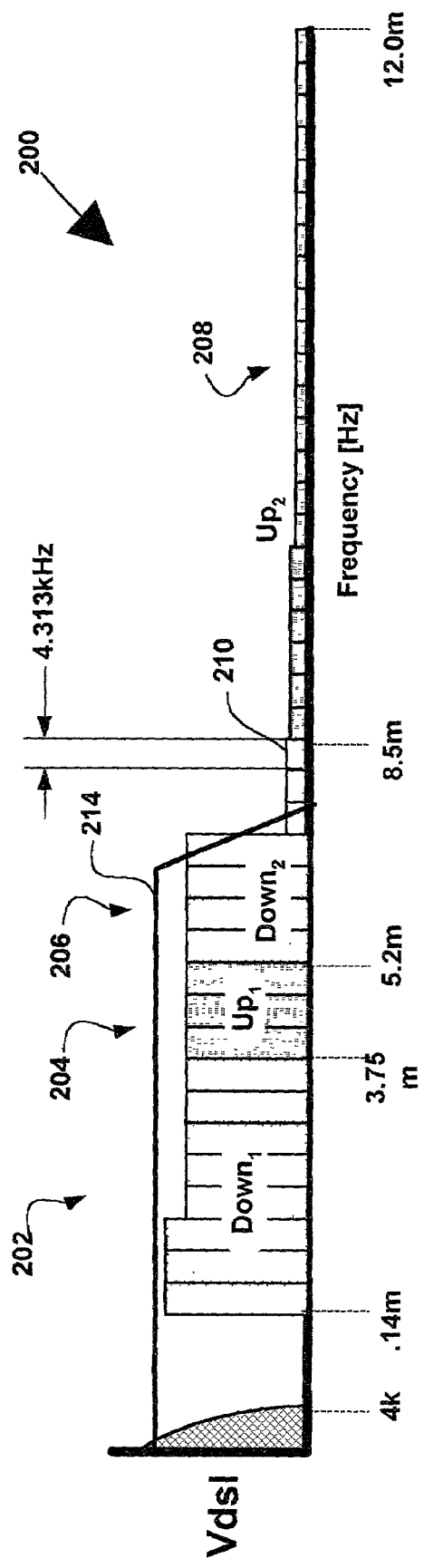
FIG. 2A
FIG. 2B

METHOD AND APPARATUS FOR TIME DOMAIN EQUALIZATION IN AN XDSL MODEM

CROSS REFERENCE TO RELATED APPLICATION

This application claims the benefit of prior filed now abandoned Provisional Applications No. 60/209,880 filed on Jun. 6, 2000 entitled "Least Square Constraint Length Equalizer" and 60/234,719 filed on Sep. 22, 2000 entitled "Method and Apparatus for Allocating Hardware Resources on a Time Domain Equalizer" which are incorporated herein by reference in their entirety as if fully set forth herein.

BACKGROUND OF THE INVENTION

1. Field of Invention

The field of the present invention relates in general to modems and more particularly digital modems.

2. Description of the Related Art

Digital Subscriber Lines (DSL) technology and improvements thereon including: G.Lite, ADSL, VDSL, HDSL all of which are broadly identified as X-DSL have been developed to increase the effective bandwidth of existing subscriber line connections to high speed back bone networks developed by telecommunications companies. An X-DSL modem operates at frequencies higher than the voice band frequencies, thus an X-DSL modem may operate simultaneously with a voice band modem or a telephone conversation. Currently there are over ten discrete XDSL standards, including: G.Lite, ADSL, VDSL, SDSL, MDSL, RADSL, HDSL, etc. Within each standard there are at least two possible line codes, or modulation protocols, discrete multitone (DMT) and carrier less AM/PM (CAP).

The primary limiting the bandwidth or channel capacity of any of the above discussed X-DSL protocols is interference. Interference arises from many sources including: channel cross talk, impulse or background sources, echo and intersymbol interference. Efforts are made throughout the DSL architecture to minimize interference.

Cross-talk noise comes from a adjacent telephone subscriber loops of the same or different types of transmission systems. Cross-talk is divided into what is known as near end cross talk (NEXT) and far end cross-talk (FEXT) depending on where the cross-talk is generated. NEXT is defined as cross-talk between subscriber lines in a binder coupled on one end with a common transceiver. FEXT is defined as a cross-talk affect between a receiving path and a transmitting path of the DSL transceivers on opposite ends of two different subscriber loops within the same twisted pair cable or binder. The FEXT noise at the receiver front end of a particular DSL transceiver is caused by signals transmitted by other transceivers at the opposite end of the twisted cable.

The topology of subscriber lines themselves may be used to minimize cross-talk between subscriber lines. Typically, telephone subscriber loops are organized in a binder with 10, 25, or 50 pairs each sharing a common physical or electrical shield in a cable. Due to capacitance and inductive coupling there's cross-talk between each twisted pair even though the pairs are well insulated for DC. The effective cross-talk is reduced by adapting different twist distances among different pairs in the binder group. Binder groups are also twisted such that no two groups are adjacent for long runs.

The hybrid circuit which couples the modem to the subscriber line is also designed with interference reduction in mind. The hybrid is basically a bridge circuit which allows bi-directional communication on the subscriber line. When the bridge is balanced the spillover of noise from the modem's transmitted signal to the received signal is reduced. Balancing however requires an impedance match with the telephone subscriber loop which is never fully satisfied because the input impedance of the telephone loop varies from one loop to the next due to taps and temperature variations in the individual subscriber lines.

For voice applications a certain amount of echo was considered a positive feedback for telephone conversations until the longer delays introduced by satellite links permeated the system. For a DSL system echo effects signal integrity and introduces unacceptable errors in data transmissions. An echo canceller synthesizers the echo path including the digital analog converter, the transmit filter, the hybrid circuit, the receiver filter, in the analog-to-digital converter. An echo canceller can produce an echo replica with the same transmitting data but with reverse signed to cancel the real echo on the receive path.

Another type of interference is the intersymbol interference (ISI). ISI is caused by the dispersion of the signal in the time due to the channel. Most of the physical channels posses a memory, which causes multiple versions of the scaled transmit signal to be present at the receiver. This time dispersion will cause a transmit symbol at the present time to interfere with a transmit symbol at a latter time. Even though both symbols are transmitted in the same direction by the same users, the results will be less reliable and more prone to error.

What is needed is a modem with improved capabilities for intersymbol interference mitigation.

SUMMARY OF THE INVENTION

The current invention provides a method and apparatus for time domain equalization in an XDSL modem. Time domain equalization (TEQ) is required to remove intersymbol interference on the modem receive path. Intersymbol interference results from a portion of the power associated with the transmission of each symbol of an XDSL communication channel spilling over into adjacent symbols. The interference becomes more severe as the length of the subscriber line increases. The current invention provides an adaptive approach to minimizing intersymbol interference.

In one embodiment of the invention, a received communication channel is analyzed to determine the highest frequency component thereof. Typically, there is an inverse relationship between the length of a subscriber line and the highest frequency component over which communications can be supported. In response to the frequency determination, the sampling rate for the channel is reduced to the lowest sample rate consistent with maintaining signal integrity on the highest frequency component of the channel. The sampling rate reduction may accomplished in the analog portion of the receive path, e.g. the analog-to-digital converter (ADC) or in a digital decimator coupled thereto. Concurrently the demodulator complexity is also scaled back. Where the XDSL protocol is digital multi-tone (DMT) the input sample size to the discrete Fourier transform (DFT) engine is reduced accordingly. With these adjustments in place TEQ resources may be scaled inversely. Thus as line length increases and the available bandwidth on the subscriber line is reduced more TEQ resources are made available to deal with the increased delay interval over which intersymbol interference is evidenced. Scaling of TEQ resources may be accomplished using a TEQ architecture which allows either the length or the tap line or the delay between taps to be varied.

BRIEF DESCRIPTION OF THE DRAWINGS

These and other features and advantages of the present invention will become more apparent to those skilled in the art from the following detailed description in conjunction with the appended drawings in which:

FIGS. 2A–B are graphs showing a VDSL channel spectrum for a short and long subscriber line respectively.

DETAILED DESCRIPTION OF THE EMBODIMENTS

An apparatus and method for reducing interference over a common communication medium, wired or wireless is provided. In one embodiment of the invention, a received communication channel is analyzed to determine the highest frequency component thereof. Typically, there is an inverse relationship between the length of a subscriber line and the highest frequency component over which communications can be supported. In response to the frequency determination, the sampling rate for the channel is reduced to the lowest sample rate consistent with maintaining signal integrity on the highest frequency component of the channel. The sampling rate reduction may accomplished in the analog portion of the receive path, e.g. the analog-to-digital converter (ADC) or in a digital decimator coupled thereto. Concurrently the demodulator complexity is also scaled back. Where the XDSL protocol is digital multi-tone (DMT) the input sample size to the discrete Fourier transform (DFT) engine is reduced accordingly. With these adjustments in place TEQ resources may be scaled inversely. Thus as line length increases and the available bandwidth on the subscriber line is reduced more TEQ resources are made available to deal with the increased delay interval over which intersymbol interference is evidenced. Scaling of TEQ resources may be accomplished using a TEQ architecture which allows either the length or the tap line or the delay between taps to be varied.

The apparatus provides support for multiple modem protocols including X-DSL protocols such as G.Lite, ADSL, VDSL, SDSL, MDSL, RADSL, and HDSL. The apparatus supports multiple line codes such as the discrete multi-tone (DMT) and carrier less AM/PM (CAP) line codes associated with X-DSL communications. The apparatus may be implemented in hardware, firmware or software.

Figure 1:
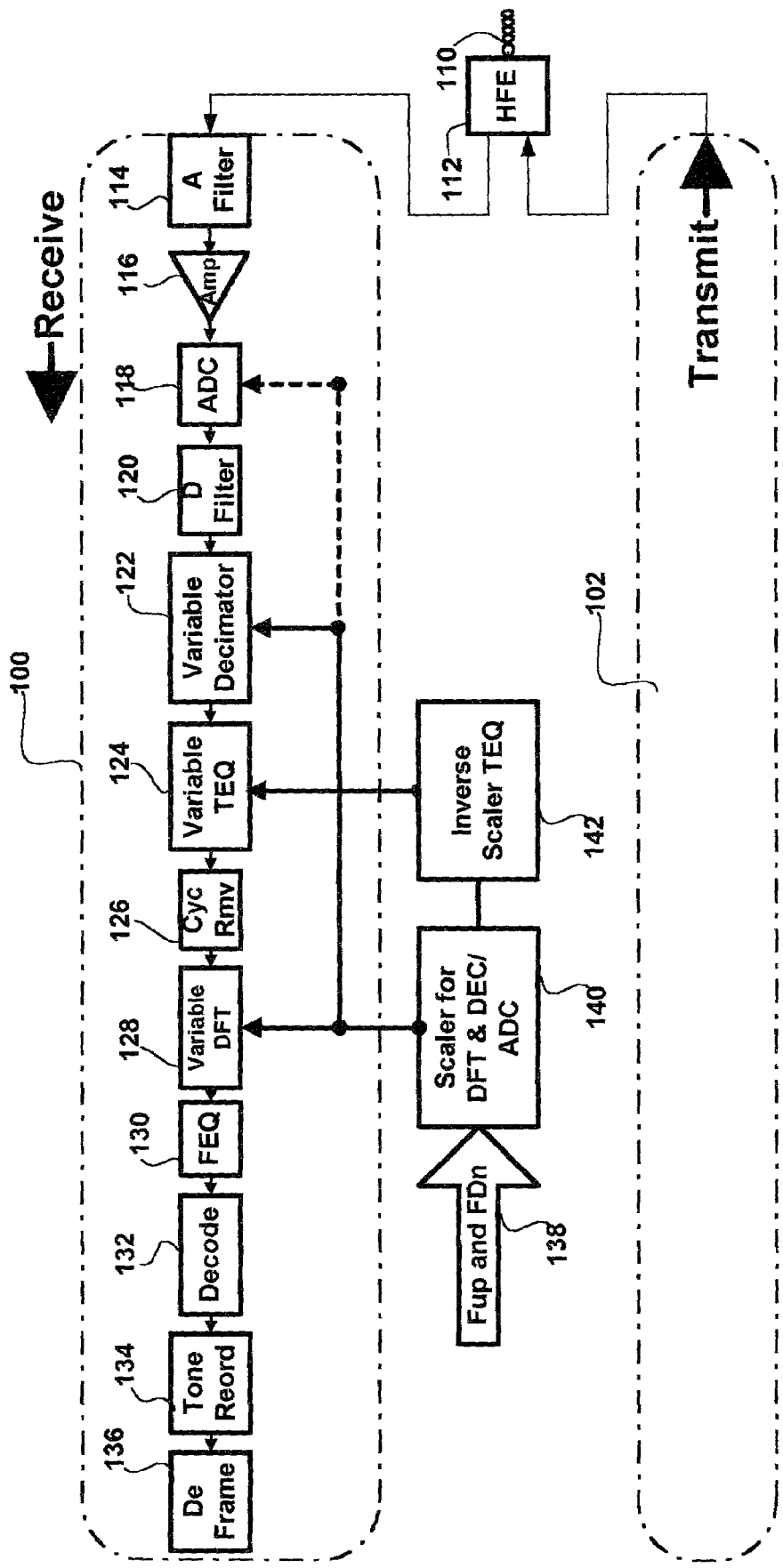
FIG. 1 is a hardware block diagram showing a receive path of an DSL modem incorporating scalers for the sampling rate and time domain equalizer (TEQ).

FIG. 1 is a hardware block diagram showing a receive path of an XDSL modem incorporating scalers for the sampling rate and time domain equalizer (TEQ). A hybrid front end (HFE) 112 couples the components of the local modems receive path 100 and the transmit path 102 over a subscriber line 110 with a remote modem (not shown). The receive path includes an analog filter 114. The analog filter accepts input from the HFE and provides filtered analog output to the amplifier 116. The amplifier couples to the analog-to-digital (ADC) 118 the output of which are digitized samples of the analog input. In an embodiment of the invention the sampling rate of the ADC is variable. The output of the ADC may be digitally filtered in filter 120. Next, the digital sample stream may be subject to decimation in decimator 122. In an embodiment of the invention the decimation amount is variable. The digitized samples are then subject to time domain equalization in a TEQ 124 in which either or both the length of the delay line or the number of delays between taps may be varied as will be described in greater detail in the following FIGS. 5–6. Next any cyclic extensions are removed in cyclic remover 126. Then the raw digital data is demodulated in discrete Fourier transform (DFT) engine 128. In an embodiment of the invention the sample size of the DFT engine may be varied. The final processing of the received demodulated data is accomplished in the frequency domain equalizer (FEQ) 128, the decoder 132, the tone reorderer 134 and the deframer 136.

In an embodiment of the invention a scaler 140 couples to the variable DFT 128 and either or both the ADC 118 and the variable decimator 122. The scaler accepts input 138 during the training phase for each channel from the modem or digital subscriber line controllers (DSLAM) (not shown). That input includes the maximum useable downstream frequency and may additionally include where VDSL protocol is implemented the maximum useable upstream frequency for each channel. These depend on the line quality, quality of service and other factors. The scaler determines the required sampling rate based on the highest usable frequency. In an embodiment of the invention the required sampling rate may be twice the highest usable frequency. Once the scaler has determined the rate, either or both the ADC and variable decimator are adjusted to produce at the output of the decimator, the desired sampling rate. As line lengths increase and usable frequency range decreases the sampling rate will be reduced. Where the XDSL line code is digital multi tone (DMT) the scaler 140 also reduces the number of inputs per symbol to the DFT. With the sampling rate for the receive path thus scaled the TEQ scaler 142 implements an inverse scaling of the TEQ architecture. This is effected by varying either or both the length of the TEQ delay line or the number of delay blocks between each tap. Either of these adjustments have the effect of taking limited TEQ resources and scaling them to match the length of the subscriber line. Thus, as subscriber line length increases and the usable upper frequency range decreases, the TEQ is scaled to better handle the increase in intersymbol interference associated with longer subscriber lines.

The hardware blocks shown in this and the following figures may be alternately implemented in software or firmware. The receive path described above and the scalable components thereof may be applied with equal advantage to where a plurality of XDSL channels are multiplexed on a common receive path. The receive path components may be coupled to one another either by packet based transfer of successive packetized portions of a communication channel or by dedicated point-to-point coupling between components.

FIGS. 2A–B are graphs showing a VDSL channel spectrum 200 for a short and long subscriber line respectively. In FIGS. 2A–B a plurality of tone bins are shown across two upstream 204, 208 and two downstream 202, 206 communication ranges. Each tone bin, e.g. tone bin 210 has a bandwidth of 4.3125 kHz. In FIG. 2A there is a cutoff in the usable tone bins defined by band 212 which shows the uppermost usable frequency at approximately 11 mHz. This is well into the second of the upstream communication ranges 208, and is consistent with a short subscriber loop. FIG. 2B shows a channel spectrum 200 identical to that in FIG. 2A with the exception that the upper limit of the effective communication band 214 falls in the middle of the second downstream communication range 206. This cut off is consistent with a longer subscriber line than that shown in FIG. 2A. The scaler 140 shown in FIG. 1 uses these determinations as to uppermost usable frequency to scale sampling on the receive path accordingly.

Figure 3A:
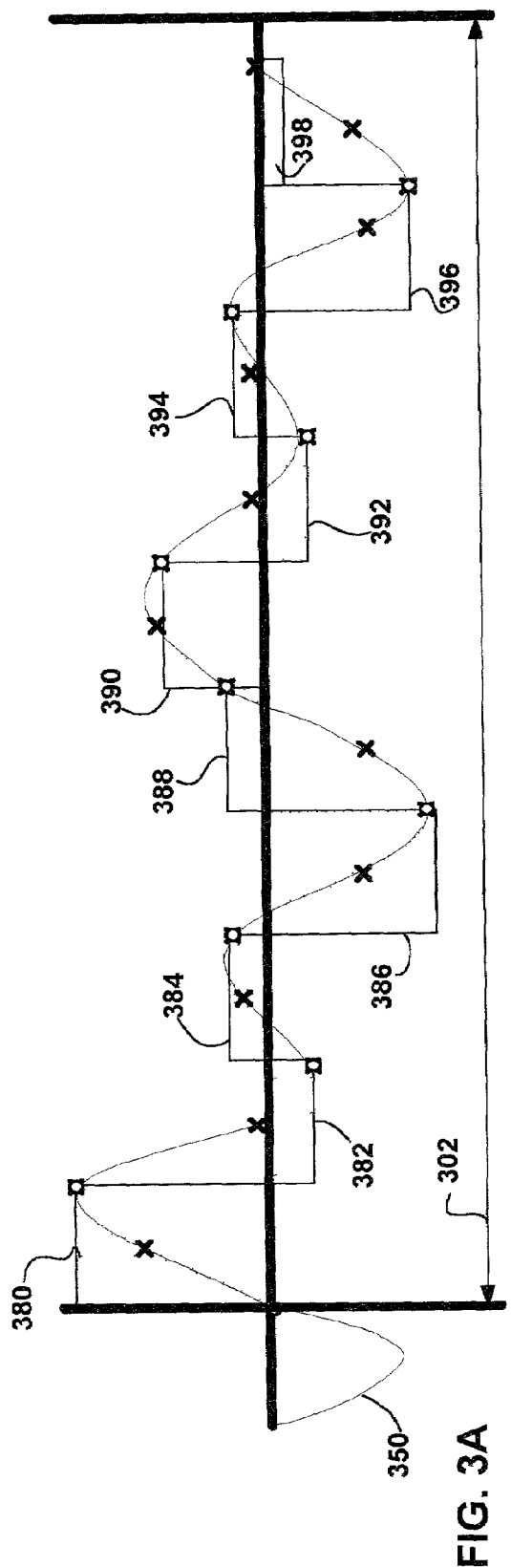
FIGS. 3A–B are graphs showing received analog signals and the sampling thereof for a short and long subscriber line respectively.
Figure 3B:
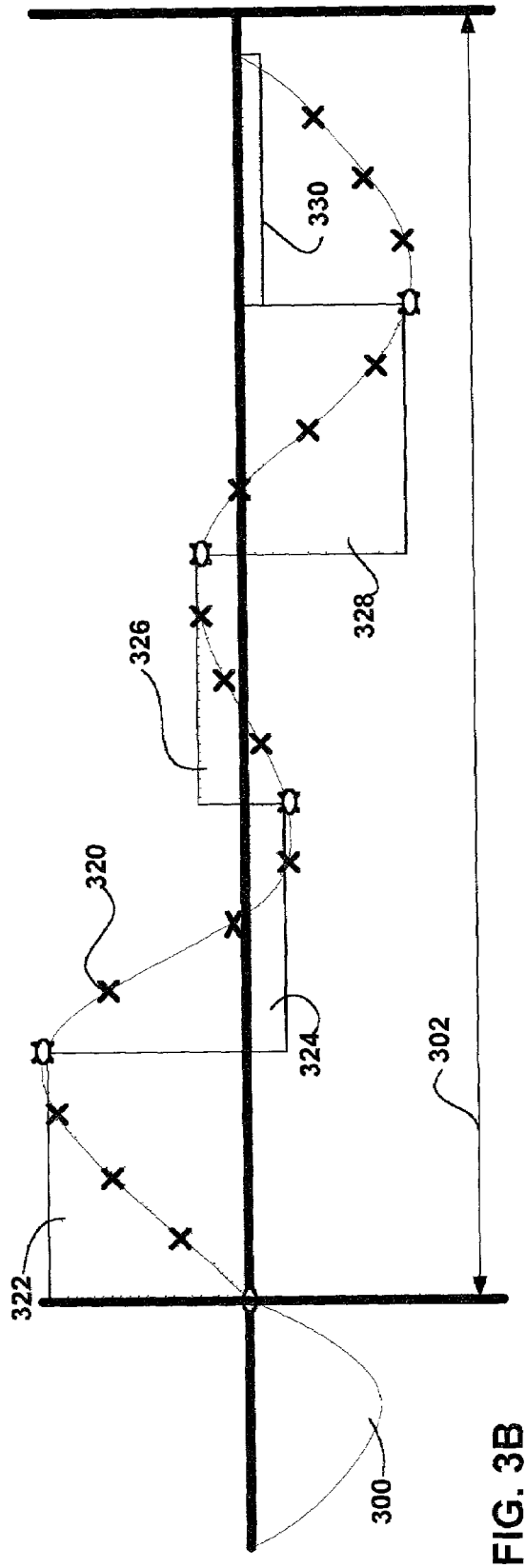

FIGS. 3A–B are graphs showing received analog signals and the sampling thereof for a short and long subscriber line respectively. In FIG. 3A an analog input signal 350 is shown with "x"s and "o"s marking spaced apart at time intervals corresponding to the highest sampling rate of which the receive path is capable. The signal is shown over a time interval 302 which corresponds with a symbol interval, i.e. the time required to receive a symbol. The scaler sets the actual sampling of the analog input 350 to be at or above the Nyquist rate but still well below in many cases the actual sampling rate of which the receive path is capable. Actual sampling occurs at ten discrete digital steps 380–398. In FIG. 3B the highest frequency component of the analog input signal 300 is reduced as evidenced in the waveform profile. This is consistent with a signal received over a longer subscriber loop such as that described above in connection with FIG. 2B. For this analog input sampling at or above Nyquist will require fewer digital samples than the waveform shown in FIG. 3A. Thus, digital sampling at five discrete digital steps 322–330 is shown. The scaler 140 effects this scaling of the sampling rate for each channel by varying either or both the sampling rate of the ADC 118 (See FIG. 1) or the decimation amount of decimator 122 (See FIG. 1). The scaler also varies the input sample set size for each symbol interval for the DFT 128 (See FIG. 1) accordingly.

Figure 4:
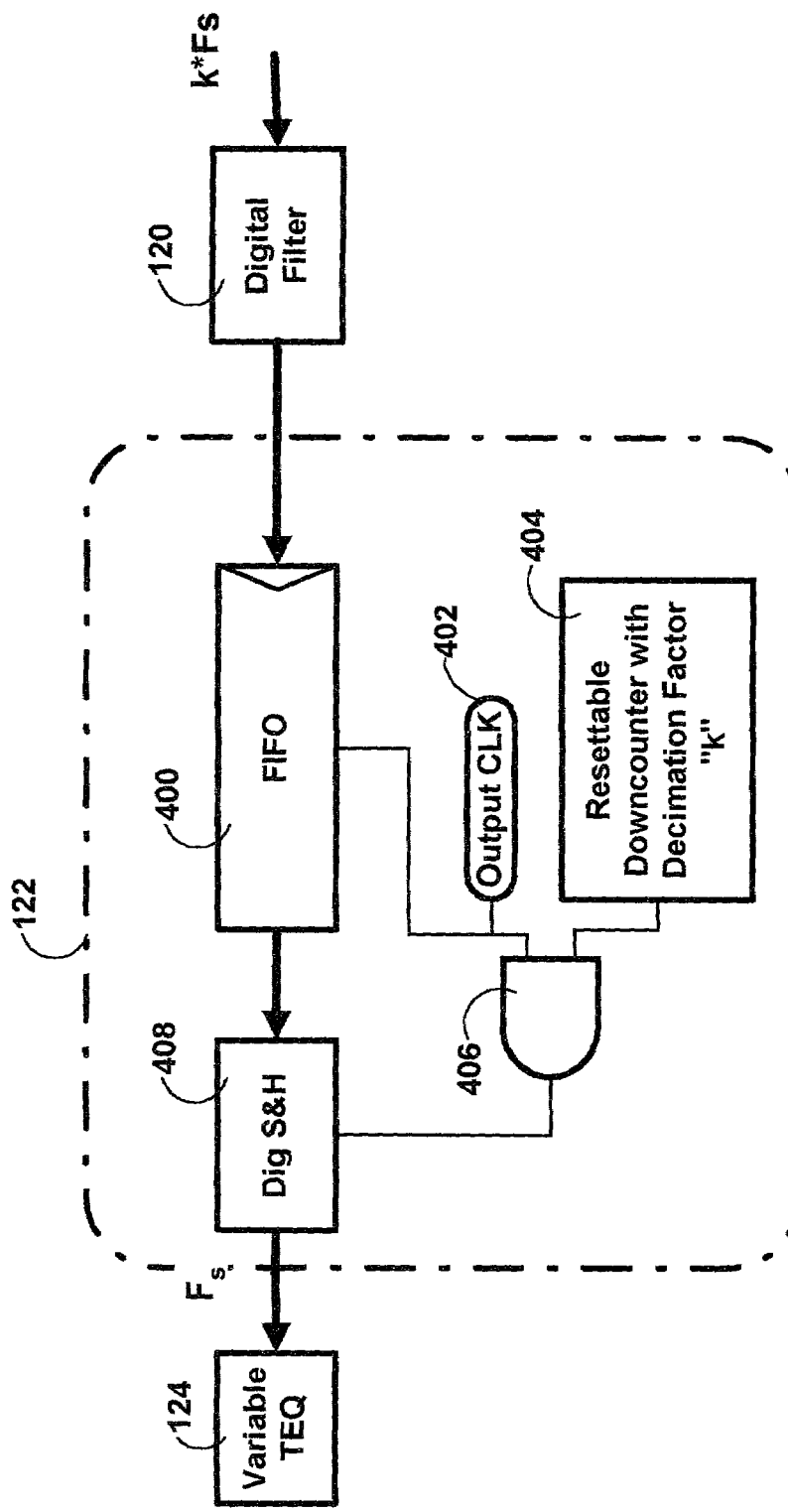
FIG. 4 is a hardware block diagram of a variable decimator.

FIG. 4 is a detailed hardware block diagram of a variable decimator 122 shown in FIG. 1. The decimator includes a FIFO input buffer 400 which accepts input from the digital filter 120 and provides clocked output at a rate determined by output clock 402 to the digital sample and hold 408. The digital sample and hold samples at intervals determined by a control signal from "AND" gate 406. The inputs of the AND gate are provided by the clock 402 and by an automatically resettable downcounter 404 which contains the decimation factor set by the scaler 140 (See FIG. 1). If the decimation factor is 1 the digital sample and hold 408 will sample the FIFO buffer on each clock, in which case the input and output sampling rates will correspond with one another. However, as the decimation factor is increased, for example for longer loop lengths, the output sampling rate from the digital sample and hold to the variable TEQ 124 will decrease with respect to the input sampling rate. Thus, the scaler 140 by increasing the k factor effects and increase in the decimation amount.

Figure 5:
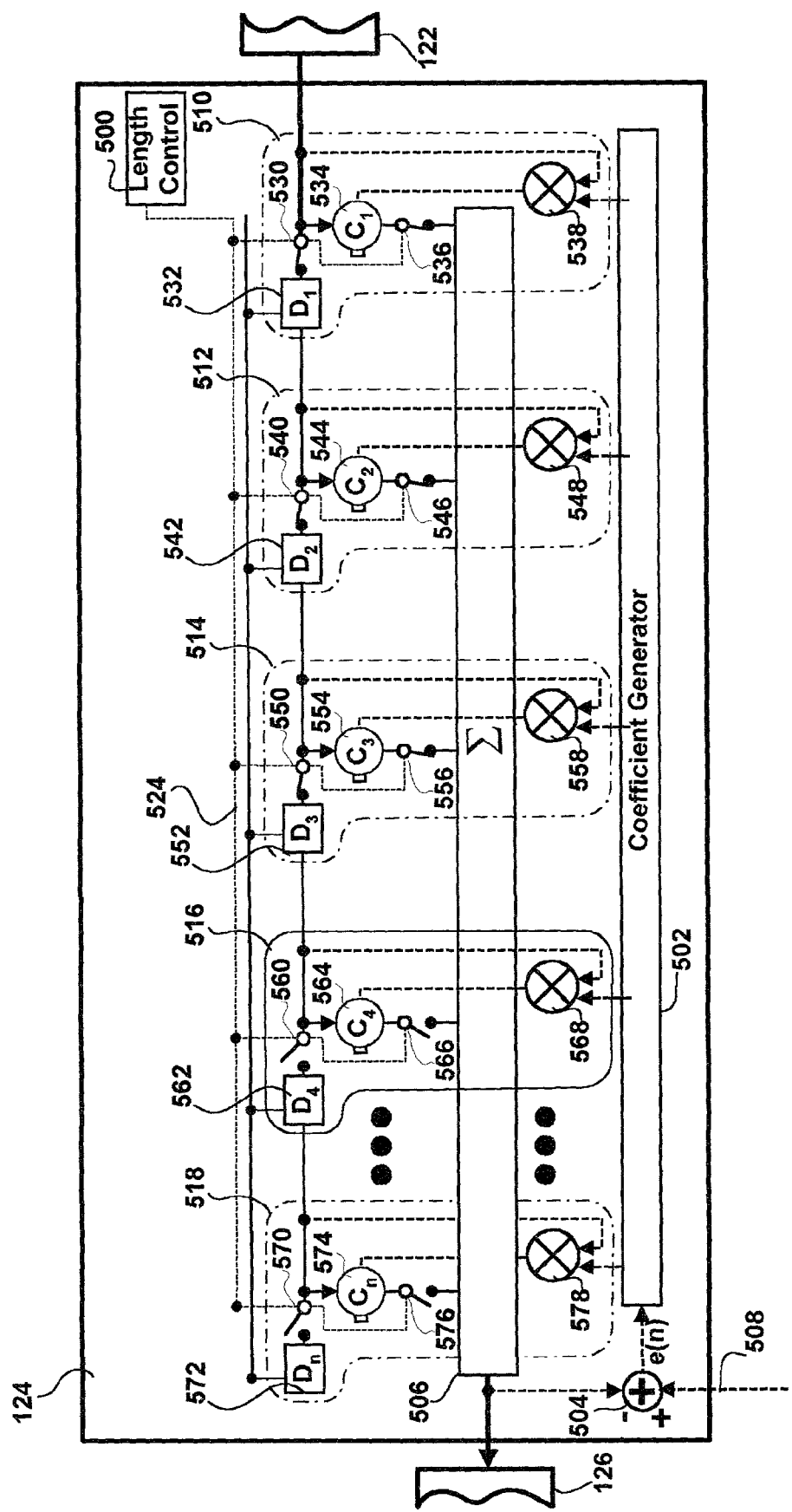
FIG. 5 is a hardware block diagram of an embodiment of a TEQ with a scalable tap number.

FIG. 5 is a hardware block diagram of an embodiment of a TEQ with a scalable tap number. Longer loops require a longer TEQ filter (higher number of taps) to achieve time domain equalization. The TEQ of the current invention may equalize various subscriber loop lengths with fixed hardware complexity. The TEQ is inversely scalable with the received bandwidth. Thus as the usable received bandwidth decreases for longer line lengths the number of taps in the TEQ can be increased to handle the longer delay times for intersymbol interference associated with the longer loops. The local and remote XDSL modems define their FFT/IFFT size, N, as set forth in the following equation:

$$N = 2^{\lceil \log 2(\max(f_u, f_d)) \rceil}$$

where $f_u$ and $f_d$ are the tone index of the maximum usable tone in the upstream and downstream, respectively. $\lceil x \rceil$ is equivalent to rounding up x to the first integer larger than x. Based on the FFT/IFFT size the sampling rate into the TEQ is set. The sampling rate into TEQ will be lower for longer loops since the useable bandwidth is less in this case. The sampling rate into TEQ can be controlled either by varying the speed of ADC or varying the decimation factor. Assuming that number of multiplications per unit time is fixed, the length of the filter in TEQ module can increase for longer loops since the sampling rate is lowered.

The variable TEQ 124 includes a plurality of delay/tap blocks 510–518 coupled serially to one another. Delay/tap block 510 accepts input from the variable decimator 122 (See FIG. 1). That input is coupled to a weighting module 534 which is switchably coupled via switch 536 to a summer 506 which services the whole delay tap line. The input from the decimator is also switchably coupled via switch 530 to delay buffer 532, the output of which delay buffer is coupled to the next delay/tap block in the TEQ. The delay/tap block 510 also includes a multiplier 538 which during a training phase accepts input from the decimator along with input of a corresponding training coefficients from a coefficient generator 502 and provides the product thereof as an input to the weighting module 534. During the operational phase the weighting module contains a weighting factor determined during the training phase which it multiplies times each input sample from the decimator and provides to the summer.

The next in the series of delay/tap blocks is block 512, which accepts input from the delay buffer of the previous delay/tap block. That input is coupled to a weighting module 544 which is switchably coupled via switch 546 to the summer 506. The input from the previous delay/tap block is also switchably coupled via switch 540 to delay buffer 542, the output of which delay block is coupled to the next delay/tap block in the TEQ. The delay/tap block 512 also includes a multiplier 548 which during the training phase accepts input from the prior delay/tap block along with input of a corresponding training coefficients from the coefficient generator 502 and provides the product thereof as an input to the weighting module 544.

The next in the series of delay/tap blocks is block 514, which accepts input from the delay buffer of the previous delay/tap block. That input is coupled to a weighting module 554 which is switchably coupled via switch 556 to the summer 506. The input from the previous delay/tap block is also switchably coupled via switch 550 to delay buffer 552, the output of which delay block is coupled to the next delay/tap block in the TEQ. The delay/tap block 514 also includes a multiplier 558 which during the training phase accepts input from the prior delay/tap block along with input of a corresponding training coefficients from the coefficient generator 502 and provides the product thereof as an input to the weighting module 554.

The next in the series of delay/tap blocks is block 516, which accepts input from the delay buffer of the previous delay/tap block. That input is coupled to a weighting module 564 which is switchably coupled via switch 566 to the summer 506. The input from the previous delay/tap block is also switchably coupled via switch 560 to delay buffer 562, the output of which delay block is coupled to the next delay/tap block in the TEQ. The delay/tap block 516 also includes a multiplier 568 which during the training phase accepts input from the prior delay/tap block along with input of a corresponding training coefficients from the coefficient generator 502 and provides the product thereof as an input to the weighting module 564.

The next in the series of delay/tap blocks is block 518, which accepts input from the delay buffer of the previous delay/tap block. That input is coupled to a weighting module 574 which is switchably coupled via switch 576 to the summer 506. The input from the previous delay/tap block is also switchably coupled via switch 570 to delay buffer 572, the output of which delay block is coupled to the next delay/tap block in the TEQ. For the last delay/tap block there may be no delay buffer. The delay/tap block 518 also includes a multiplier 578 which during the training phase accepts input from the prior delay/tap block along with input of a corresponding training coefficients from the coefficient generator 502 and provides the product thereof as an input to the weighting module 574.

The chain of delay/tap blocks 510–518 may be varied in length by means of length control module 500. This module receives input from the TEQ scaler 142 (See FIG. 1) and provides output on signal line 524 to the first of the switch pairs 530,536 or 540,546 or 550,556 or 560,566 or 570,576 at which it wants to introduce a break in the chain of delay tap blocks. The prior switches in the chain remain closed.

The length of the delay/tap block sequence may be set either before training or after. During a training phase a channel is received from the decimator 122 and the corresponding training sequence for that channel is input on signal line 508 to differencer 504. The other input to differencer is provided by the output of the summer 506 which couples to the cyclic extension remover 126 (See FIG. 1). The error signal is fed back to the coefficient generator 502 which modifies the weighting coefficients which it outputs to the corresponding weighting modules 534, 544, 554, 565, 574. This closed loop feedback process continues until optimal weighting coefficients are determined at which point they are locked into the weighting modules for runtime utilization to equalize each channel.

Figure 6:
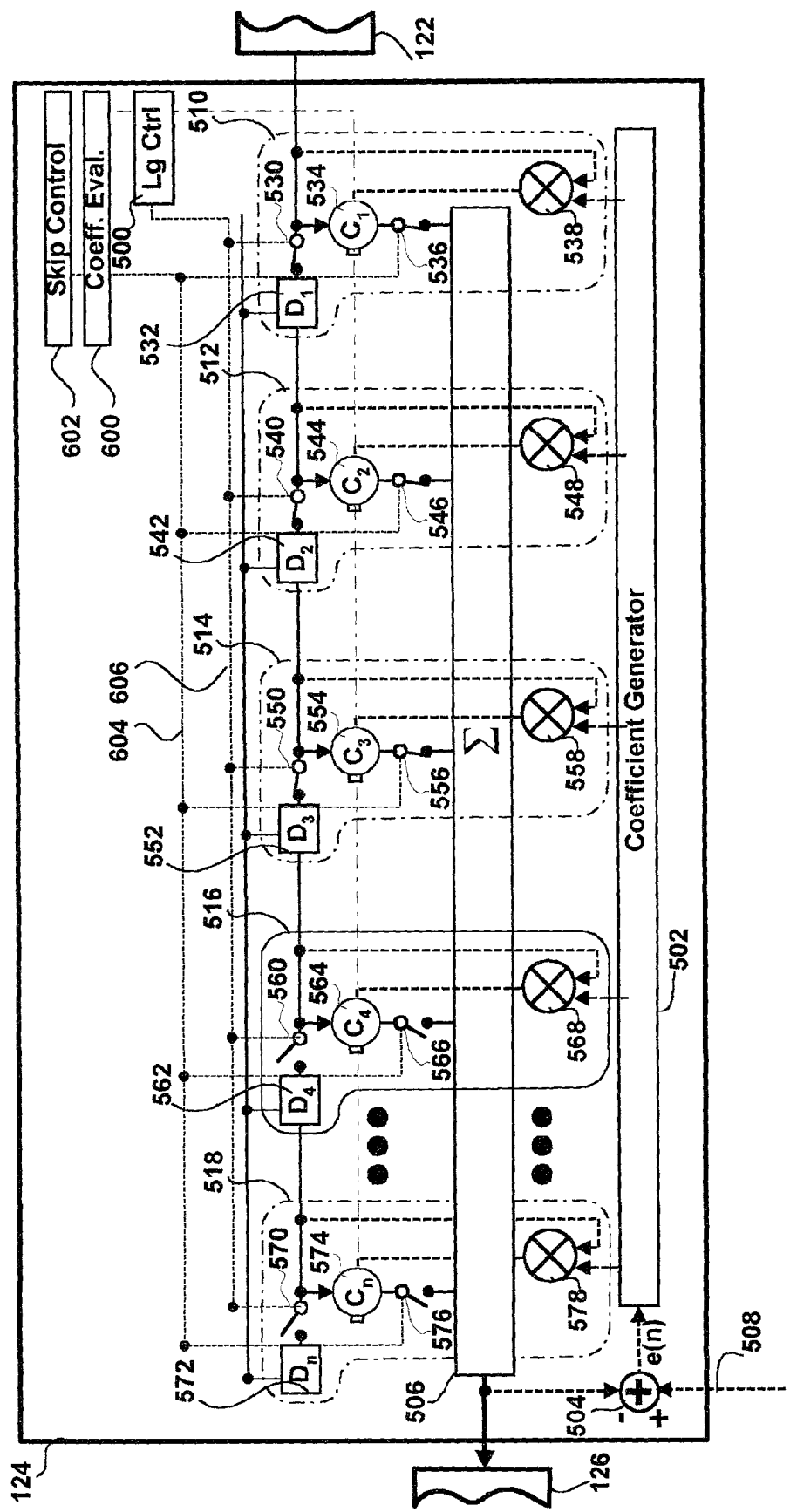
FIG. 6 is a hardware block diagram of an embodiment of the TEQ with both a scalable tap number and scalable delay between taps.

FIG. 6 is a hardware block diagram of an embodiment of the TEQ with both a scalable tap number and scalable delay between taps. The hardware blocks shown are identical to those shown in FIG. 5 with the exception that the pair of switches within each delay/tap block may be independently opened or closed. In this embodiment of the invention the length control 500 couples via signal line 606 only to switches 530,540,550,560,570 and determines where the delay chain terminates, i.e. its length. During the training phase the full length of the TEQ may be used to evaluate coefficients. During the operational phase the TEQ length may be shortened. Additionally, a coefficient evaluator 600 and skip controller 602 have been added. The skip controller couples to switches 536,546,556,566,576 via signal line 604. The skip controller can avoid the multiplication and tap generation for any delay/tap block, thereby rendering delay buffer the only operational part of the delay/tap block. The length control 500 and skip control 602 can thus set up the TEQ with not only a variable length but with a configurable number of delay buffers between taps. Thus, for example weighting modules 544 and 554 could be uncoupled from the summer 506 during the operational phase. In this configuration there would be two delay buffers 540,550 separating active taps from weighting modules 534 and 564 to the summer. This technique allows the same number of taps to be applied to an input stream but with configurable and varied delays between active taps.

The coefficient evaluator couples to the weighting modules 534,544,554,564,574 at the completion of training to determine among all the coefficients generated for the entire chain which are the coefficients and associated taps that will be used during the run-time phase. By only using the best N taps of a M-tap TEQ filter, the complexity and storage requirements are reduced while at the same time providing the span of a M-tap filter.

To determine which coefficients will be utilized an estimation algorithm may be used to estimate the N taps of the TEQ filter will be used to equalize the channel, h=[h(0), . . . , h(N−1)]. The best J taps are extracted, the best coefficients being the solution of a constrained minimization procedure. One possible procedure is as below:

N estimated taps are sorted. In this example the largest tap is first,
h(g(i)) for i=0, . . . ,N−1; where g(i) is the mapping index, h(g(i+1)) less than or equal to h(g(i)), and g(i)∈{0, . . . ,N−1}.
First J largest taps, h(g(i)) for i=0, . . . , J−1 are extracted
The following equation is implemented to equalize the channel:

$$y(n) = \sum_{i=0}^{J} h(g(i)) * x(n - g(i))$$

where, x(n) is the received signal and y(n) is the output.

Figure 7:
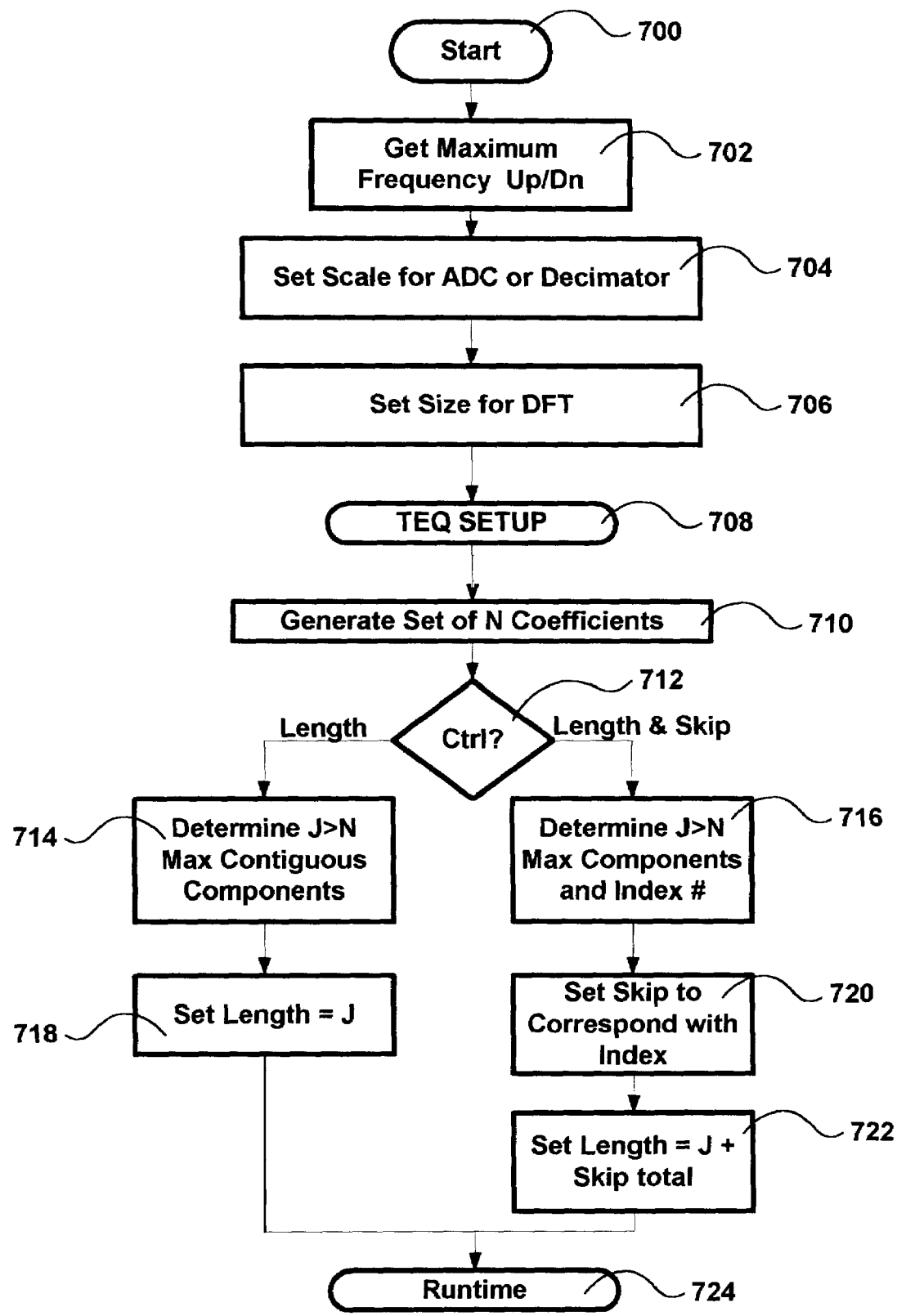
FIG. 7 is a process flow diagram of the processes for scaling sampling rate and TEQ architecture on the receive path of an XDSL modem.

Using this method the entire length of the TEQ delay/tap blocks are used during the training phase as setup by the skip controller FIG. 7 is a process flow diagram of the processes for scaling sampling rate and TEQ architecture on the receive path of an XDSL modem. Processing begins at start block 700 from which control passes to process 702 in which the maximum frequency of the received communications is determined. Alternately, in the case of VDSL where channel orthogonality is an issue, the maximum frequency determined in this process is the maximum upstream or downstream frequency, whichever is larger. Next in process 704 the scaler 140 (See FIG. 1) sets the sampling rate for the ADC and/or the decimation rate for the decimator 122 (See FIG. 1). Then in process 706 the scaler 140 sets the number of tone bins per symbol for the DFT accordingly.

The next phase 708 involves the setup of the TEQ. This process commences in process 710 in which a set of N coefficients are generated for the N weighting modules in the TEQ. Next, in decision process 712 a determination is made as to whether length control of the TEQ or length and skip control will be utilized for the TEQ. If length and skip control is implemented as shown in FIG. 6 then control passes to process 716. In process 716 the N coefficients are evaluated and J less than N are selected based on magnitude or some other selection criteria. Then in process 720 the skip control 602 (See FIG. 6) sets couples selected ones of the weighting modules from the summer and uncouples the remaining weighting modules. Next in process 722 the length of the TEQ chain is determined by length control 500 (See FIG. 6). The length is set equal to the number of taps J that are active plus the number of taps that are skipped or inactive. Control then passes to the operational phase.

Alternately in decision process 712 a determination is made that length control alone of the TEQ as shown in FIG. 5 is to be implemented then control passes to process 714. In process 714 the N coefficients are evaluated and J less than N are selected based on magnitude or some other selection criteria. The J coefficients are all contiguous in this embodiment of the invention since no skip control is effected. Then in process 718 the length of the delay/tap block line is set and control passes to process 724 for commencement of the operational phase.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus: for suppressing intersymbol interference in a received communication channel of a modem comprising:
    means for adjusting the sampling rate of the received communication channel;
    a time domain equalizer (TEQ) with a plurality of taps into the received communication channel and the TEQ responsive to an adjustment of the sampling rate by the means for adjusting to configure at least one of a number of taps and delays between the taps operating on the receive path and the TEQ including:
        a delay line accepting successive portions of a received communication channel;
        taps off of the successive portions of the delay line with each tap configured to scale each successive portion by an associated weighting coefficient to provide a corresponding scaled output;
        a summer coupled to the taps to sum the scaled outputs there from;
        a controller to varying at least one of: a length of the delay line, a number of the taps providing output to the summer and a number of successive portions of the received communication channel between taps;
        weighting modules each with an input coupled to a corresponding successive portion of the delay line and an output coupled to the summer, and each of the weighting modules configured to scale each corresponding successive portion by the associated weighting coefficient to provide the corresponding scaled output; and
        switches each associated with a corresponding weighting module to switchably control the coupling thereof between the delay line and the summer, and the switches operative to uncouple selected ones of the weighting modules to vary a number of the taps providing output to the summer.

2. A method for reducing intersymbol interference in a communication channel of received by a multi-tone X-DSL modem coupled to the subscriber line, and the method comprising:
    initiating multi-tone modulation of the communication channel over the subscriber line over a frequency range proscribed by a corresponding X-DSL communication protocol;
    determining whether the received communication channel initiated in the initiating act exhibits a cutoff frequency less than a maximum frequency proscribed by the corresponding X-DSL communication protocol, above which cutoff frequency communications are not supportable;
    reducing a sampling rate of the received communication channel below a sampling rate required to support the corresponding X-DSL communication protocol responsive to the determination of the cutoff frequency in the determining act; and
    increasing at least one of a number of time domain equalization taps operating on a receive path of the multi-tone X-DSL modem and delays between the taps operating on the receive path responsive to the reduction of the sampling rate in the reducing act, whereby a number of time domain equalization taps increase in correspondence with a length of the subscriber line thereby offsetting an increase in intersymbol interference associated therewith; and
    reducing a number of tones per symbol transformed from a time domain to a frequency domain responsive to a reduction in the sampling rate of the received communication channel in the reducing act.

3. A multi-tone X-DSL modem with a transmit path and a receive path both configured to couple to at least one subscriber line for modulation and demodulation of a communication channel in an X-DSL communication protocol, and the multi-tone modem comprising:
    a time domain equalizer (TEQ) coupled to the receive path for time domain equalization of a received communication channel and the TEQ configurable as to at least one of a number of time domain equalization taps on the receive path and delays between the taps operating on the receive path;
    a discrete Fourier transform (DFT) component coupled to the receive path and configurable as to a number of tones per symbol of the received communication channel transformed from a time domain to a frequency domain; and
    at least one scaler coupled to the TEQ and the DFT component and the at least one scaler responsive to a determination that the received communication channel exhibits a cutoff frequency less a maximum frequency proscribed by the X-DSL communication protocol to reduce both a sampling rate of a received communication channel together with a number of tones per symbol transformed by the DFT component and to increase at least one of a number of time domain equalization taps on the receive path and delays between the taps on the receive path, thereby scaling the receive path to conform with a length of the at least one subscriber line.

4. The apparatus of claim 3, further comprising at least one of the following components coupled to the receive path and to the scaler to vary the sampling rate of the received communication channel:
    an analog-to-digital converter with a variable sampling rate; and
    a decimator with a variable decimation amount.

5. The multi-tone X-DSL modem of claim 3, wherein the TEQ further comprises:
    a delay line accepting successive portions of the received communication channel;

taps off of the successive portions of the delay line with each tap configured to scale each successive portion by an associated weighting coefficient to provide a corresponding scaled output;

a summer coupled to the taps to sum the scaled outputs there from; and a skip controller to determine from relative magnitudes of the associated weighting coefficients for each of the taps generated in a training phase of operation the taps providing output to the summer.

6. A modem with a transmit and a receive path both configured to couple to at least one subscriber line and the modem comprising:

a time domain equalizer (TEQ) having taps on the receive path of the modem to reduce intersymbol interference therein, and the TEQ configurable to vary at least one of a number of taps and delays between the taps operating on the receive path;

a delay line accepting successive portions of a received communication channel;

taps off of the successive portions of the delay line with each tap configured to scale each successive portion by an associated weighting coefficient to provide a corresponding scaled output;

a summer coupled to the taps to sum the scaled outputs there from;

a controller to varying at least one of: a length of the delay line, a number of the taps providing output to the summer and a number of successive portions of the received communication channel between taps;

weighting modules each with an input coupled to a corresponding successive portion of the delay line and an output coupled to the summer, and each of the weighting modules configured to scale each corresponding successive portion by the associated weighting coefficient to provide the corresponding scaled output; and switches each associated with a corresponding weighting module to switchably control the coupling thereof between the delay line and the summer, and the switches operative to uncouple selected ones of the weighting modules to vary a number of the taps providing output to the summer.

* * * * *